(12) United States Patent
Onishi et al.

(10) Patent No.: US 9,429,265 B2
(45) Date of Patent: Aug. 30, 2016

(54) LINING METHOD FOR CONDUIT AND LINING MATERIAL COMPOSITE FOR CONDUIT

(75) Inventors: Shinji Onishi, Settsu (JP); Hiroshi Tsuzuki, Settsu (JP); Yasuhiro Ueda, Settsu (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 30 days.

(21) Appl. No.: 14/391,968

(22) PCT Filed: Apr. 12, 2012

(86) PCT No.: PCT/JP2012/060021
§ 371 (c)(1),
(2), (4) Date: Nov. 13, 2014

(87) PCT Pub. No.: WO2013/153652
PCT Pub. Date: Oct. 17, 2013

(65) Prior Publication Data
US 2015/0068632 A1    Mar. 12, 2015

(51) Int. Cl.
*F16L 55/179* (2006.01)
*F16L 55/165* (2006.01)
(Continued)

(52) U.S. Cl.
CPC ............ *F16L 55/1654* (2013.01); *B29C 63/34* (2013.01); *B32B 1/08* (2013.01); *B32B 3/02* (2013.01);
(Continued)

(58) Field of Classification Search
CPC ............ F16L 55/1653; F16L 55/1654; F16L 55/1656; F16L 55/179
USPC ................... 138/98, 97; 156/287, 269, 516; 405/150.1, 184.2; 264/516, 572, 573, 264/269
See application file for complete search history.

(56) References Cited

U.S. PATENT DOCUMENTS

| 5,186,987 A | * | 2/1993 | Imoto | B32B 5/26 138/128 |
| 5,334,429 A | * | 8/1994 | Imoto | B29C 63/34 138/128 |

(Continued)

FOREIGN PATENT DOCUMENTS

| CN | 1161220 C | 8/2004 |
| CN | 101196264 A | 6/2008 |

(Continued)

OTHER PUBLICATIONS

Combined Search Report and Written Opinion issued Sep. 2, 2015 in Singaporean Patent Application No. 11201406522S.

(Continued)

*Primary Examiner* — Patrick F Brinson
(74) *Attorney, Agent, or Firm* — Oblon, McClelland, Maier & Neustadt, L.L.P.

(57) ABSTRACT

A lining material obtained by rolling a lining material sheet into a tubular form is installed in a conduit with both ends of the lining material sheet in its circumferential direction circumferentially overlapping each other. In this process, the lining material is installed so that, in a bending portion of a conduit, an overlapping portion where the both ends of the lining material sheet overlap each other faces toward an outer curvature side of the bending portion. Then, the diameter of the lining material installed in the conduit is expanded with the both ends of the lining material sheet circumferentially slid on each other. This facilitates inflation of a portion of the lining material which portion faces toward the outer curvature side in the bending portion, thereby decreasing a gap between the lining material and an inner surface of the bending portion.

8 Claims, 15 Drawing Sheets

(51) Int. Cl.
  *B29C 63/34* (2006.01)
  *B32B 3/02* (2006.01)
  *B32B 5/02* (2006.01)
  *B32B 5/06* (2006.01)
  *B32B 5/26* (2006.01)
  *B32B 1/08* (2006.01)
  *B29L 23/00* (2006.01)

(52) U.S. Cl.
  CPC .............. *B32B 5/022* (2013.01); *B32B 5/024* (2013.01); *B32B 5/06* (2013.01); *B32B 5/26* (2013.01); *F16L 55/1653* (2013.01); *F16L 55/1656* (2013.01); *B29L 2023/004* (2013.01); *B32B 2260/023* (2013.01); *B32B 2260/046* (2013.01); *B32B 2262/02* (2013.01); *B32B 2262/101* (2013.01); *B32B 2597/00* (2013.01)

(56) References Cited

U.S. PATENT DOCUMENTS

| | | | |
|---|---|---|---|
| 5,725,026 A * | 3/1998 | Maimets | F16L 55/163 138/97 |
| 5,836,357 A * | 11/1998 | Kittson | B29C 53/382 138/124 |
| 5,861,116 A | 1/1999 | Mandich | |
| 5,950,682 A | 9/1999 | Kiest, Jr. | |
| 6,250,385 B1 * | 6/2001 | Montaron | E21B 43/086 166/207 |
| 9,163,771 B1 * | 10/2015 | Higman | F16L 55/1653 |
| 2010/0282351 A1 * | 11/2010 | Kamiyama | F16L 55/1656 138/98 |
| 2012/0199276 A1 * | 8/2012 | Rodenberger | B29C 63/36 156/215 |
| 2013/0019982 A1 | 1/2013 | Kobayashi | |
| 2014/0034175 A1 * | 2/2014 | Fyfe | F16L 55/165 138/97 |

FOREIGN PATENT DOCUMENTS

| | | |
|---|---|---|
| EA | 001142 B1 | 10/2000 |
| GB | 2 113 608 A | 8/1983 |
| JP | 56-8229 | 1/1981 |
| JP | 61-143129 A | 6/1986 |
| JP | 5-278177 | 10/1993 |
| JP | 5-506821 | 10/1993 |
| JP | 6-246830 | 9/1994 |
| JP | 2001-30354 A | 2/2001 |
| JP | 2001-47512 A | 2/2001 |
| JP | 2001-116165 | 4/2001 |
| JP | 2001-219471 A | 8/2001 |
| JP | 2003-231177 | 8/2003 |
| JP | 2004-144137 A | 5/2004 |
| JP | 2008-201062 A | 9/2008 |
| JP | 2011-42164 | 3/2011 |
| JP | 2011-104786 | 6/2011 |
| JP | 2012-6273 A | 1/2012 |
| JP | 2012-86386 | 5/2012 |
| KR | 10-0813860 B1 | 3/2008 |
| RU | 2145028 C1 | 1/2000 |
| TW | 405005 B | 9/2000 |
| TW | 201036802 A1 | 10/2010 |
| WO | WO 91/14896 A1 | 10/1991 |
| WO | WO 2011/125534 A1 | 10/2011 |

OTHER PUBLICATIONS

International Search Report issued Jul. 10, 2012, in PCT/JP12/060021 filed Apr. 12, 2012.
International Preliminary Report on Patentability and Written Opinion issued on Oct. 23, 2014 in PCT/JP2012/060021 with English translation.
Office Action issued Dec. 14, 2015 in Taiwanese Patent Application No. 101113207 (with English translation).
Supplementary Search Report issued Jan. 21, 2016 in European Patent Application No. 12874221.0.
Office Action issued Dec. 30, 2015 in Chinese Patent Application No. 201280072304.8 (with English translation and English translation of category of cited documents).
Notice of Eligibility for Grant issued Feb. 24, 2016 in Singapore Patent Application No. 11201406522S.
Extended European Search Report issued May 11, 2016, for European Patent Application No. 12874221.0.
Decision to Grant issued May 17, 2016, for Russian Patent Application No. 2014145025 (English translation provided).

* cited by examiner

INNER CURVATURE SIDE ← → OUTER CURVATURE SIDE

INNER CURVATURE SIDE   OUTER CURVATURE SIDE

LINING METHOD FOR CONDUIT AND
LINING MATERIAL COMPOSITE FOR
CONDUIT

TECHNICAL FIELD

The present invention relates to: a method for lining a conduit; and a lining material for a conduit.

BACKGROUND ART

To repair an existing conduit such as an aging water supply or sewer pipe, pipe for agricultural water, or gas pipe, there have been conventionally known methods as follows: a tubular lining material including a liquid curable resin and reinforced fibers is installed on an inner surface of the existing conduit, and then the liquid curable resin is cured, thereby to construct a robust lining structure formed by a fiber reinforced resin, in the conduit.

As one of the known methods, Patent Literature 1 discloses the following method. First, a lining material sheet including high-strength short fibers spread on a liquid thermosetting resin (sheet molding compound: SMC) is rolled into a tubular lining material, and the lining material is installed in a conduit with both ends of the lining material sheet overlapping each other so as to be slidable on each other. Then, a pressurized fluid is supplied to apply an internal pressure to the tubular lining material, thereby expanding the diameter of thereof while sliding the both ends of the lining material sheet on each other, with the result that the lining material is brought into a close contact with an inner surface of the conduit. Further, a heating medium such as steam is supplied into the lining material, to set the liquid thermosetting resin included in the lining material.

CITATION LIST

Patent Literature

Patent Literature 1: Japanese Unexamined Patent Publication No. 278177/1993 (Tokukaihei 05-278177)

SUMMARY OF INVENTION

Technical Problem

If the lining material is not brought into close contact with the inner surface of the conduit in the repairing process as is described in Patent Literature 1 and thus there is a gap between the lining material and the inner surface of the conduit, the effective cross-sectional area of the repaired conduit is reduced correspondingly to the size of the gap. Therefore, it is desirable to bring the lining material into close contact with the inner surface of the conduit as far as possible when the diameter of the lining material is expanded after installed in the conduit. However, when an object to be repaired is a conduit having a bending portion P3 at a position between both ends as shown in FIG. 15, the outer curvature length of the bending portion P3 is longer than the inner curvature length of the bending portion P3. Therefore, when the diameter of the lining material 100 is expanded in the conduit, it is difficult to bring the lining material 100 into close contact with the inner surface of the bending portion P3 on the outer curvature side, and therefore it is more likely that a gap is created between the lining material 100 and the bending portion P3.

An object of the present invention is to minimize the gap between the lining material and the inner surface of the conduit, in the bending portion of the conduit.

Solution to Problem and Advantageous Effects of Invention

A first aspect of the present invention is a method for lining a conduit having a bending portion.

The method includes: an installation step of installing in the conduit a lining material obtained by rolling a lining material sheet into a tubular form, with both ends of the lining material sheet in its circumferential direction circumferentially overlapping each other; and a diameter expansion step of expanding a diameter of the lining material installed in the conduit while circumferentially sliding the both ends of the lining material sheet on each other. In the installation step, the lining material is installed so that an overlapping portion where the both ends of the lining material sheet overlap each other faces toward an outer curvature side of the bending portion, in the bending portion of the conduit.

In this aspect, the lining material is installed in the installation step so that the overlapping portion of the both ends of the lining material sheet faces toward the outer curvature side of the bending portion, in the bending portion of the conduit. Therefore, when the diameter of the lining material is expanded in the subsequent diameter expansion step, the both ends of the lining material sheet circumferentially slide on each other, while facing toward the outer curvature side of the bending portion. This facilitates inflation of a portion of the lining material which portion faces toward the outer curvature side. Consequently, a gap between the inner surface of the bending portion and the lining material is decreased, and it is more likely that the lining material fits the inner surface of the bending portion.

A second aspect of the present invention is the method of the first aspect, in which the lining material sheet includes a woven fabric made of glass yarns.

Although it is required that the lining material has a certain level of strength since the lining material is used to repair or reinforce an aging conduit, the effective cross-sectional area of the conduit is reduced if the thickness of the lining material is increased to enhance its strength. In this regard, the lining material of this aspect has a high strength since the lining material includes the woven fabric made of the glass yarns, and this allows the lining material to have a smaller thickness.

It should be noted that the above-mentioned woven fabric made of the glass yarns may be a woven glass roving fabric (a third aspect of the present invention). In this case, the strength of the lining material is further enhanced.

A fourth aspect of the present invention is the method of the second or the third aspect, in which the lining material sheet has a structure in which a non-woven fabric of organic fibers is laid on the woven fabric made of the glass yarns, and the non-woven fabric and the woven fabric are joined to each other by needle punching.

If a large external force is applied to a part of the lining material, for example, when the lining material is inserted into the conduit in the installation step or when the both ends of the lining material sheet slide on each other to expand the diameter in the subsequent diameter expansion step, there may be caused shifting of yarns (yarn slippage) in the woven fabric made of the glass yarns. In this case, the strength of the lining material is locally decreased in a portion where the yarn slippage is caused.

In this regard, the lining material sheet of this aspect has a structure in which the non-woven fabric of the organic fibers and the woven fabric made of the glass yarns are laid on each other, and are joined to each other by needle punching. The non-woven fabric has a structure in which long fibers are entangled. Therefore, if an external force is applied to the woven fabric made of the glass yarns, the non-woven fabric laid on and joined to the woven fabric by needle punching applies resistance to the glass yarns forming the woven fabric. This suppresses the yarn slippage in the woven fabric made of the glass yarns. The non-woven fabric also prevents raveling out of the woven fabric of the glass yarns at its edge. Thus, a uniform and robust lining structure is constructed inside the conduit.

A fifth aspect of the present invention is the method of the fourth aspect, in which the non-woven fabric includes a plurality of non-woven fabrics, and the non-woven fabrics are respectively laid on both sides of the woven fabric made of the glass yarns.

In this aspect, the woven fabric made of the glass yarns is sandwiched by the two non-woven fabrics, and this structure further suppresses the yarn slippage in the woven fabric and/or raveling out of the woven fabric.

A sixth aspect of the present invention is the method of any one of the first to fifth aspects, in which: the lining material is impregnated with a liquid thermosetting resin; and in the diameter expansion step, the lining material is heated and pressurized from an inside thereof, to set the liquid thermosetting resin while expanding the diameter of the lining material with the both ends of the lining material sheet slid on each other.

In this aspect, the lining material is heated and pressurized from the inside thereof in the diameter expansion step, thereby to set the liquid thermosetting resin with which the lining material is impregnated while expanding the diameter of the lining material. With this, a robust lining structure is constructed on the inner surface of the conduit.

A seventh aspect of the present invention is the method of the sixth aspect of the present invention, in which: the both ends of the lining material sheet rolled into the tubular form are joined to each other by a hot melt adhesive with the both ends overlapping each other; and in the diameter expansion step, the lining material is heated and pressurized from the inside thereof, to release the both ends joined by the hot melt adhesive.

In this aspect, the both ends of the lining material sheet are temporarily joined to each other by the hot melt adhesive, and this prevents the both ends from shifting relative to each other and thereby expanding the lining material when the lining material is inserted in the conduit in the installation step. Further, when the lining material is heated and pressurized after installed in the conduit, the hot melt adhesive is softened, and thereby its adhesion is decreased. As a result, the both ends move and slide on each other to expand the diameter of the lining material, to bring the lining material into close contact with the inner surface of the conduit, and the thermosetting resin is set in this state.

An eighth aspect of the present invention is a lining material for a conduit, the lining material being obtained by rolling a lining material sheet into a tubular form, the lining material sheet including a non-woven fabric of organic fibers and a woven fabric made of glass yarns which are laid on each other and joined to each other by needle punching. Both ends of the lining material sheet in its circumferential direction are joined to each other by a hot melt adhesive with the both ends overlapping each other.

In this aspect, the lining material has a high strength since the lining material includes the woven fabric made of the glass yarns, and this makes it possible to reduce the thickness of the lining material. Further, the non-woven fabric is laid on the woven fabric made of the glass yarns, and the non-woven fabric and the woven fabric are joined to each other by needle punching. This prevents yarn slippage of the glass yarns even if an external force is applied to the lining material at the time of installation in the conduit and/or at the time of expansion of the diameter. Further, the both ends of the lining material sheet are temporarily joined to each other by the hot melt adhesive, and this prevents the both ends from shifting relative to each other and thereby expanding the lining material when the lining material is inserted in the conduit at the time of installation. Note that, when the lining material is heated and pressurized from the inside thereof after installed in the conduit, adhesion of the hot melt adhesive is decreased. This releases the temporary joint between the both ends to allow the both ends to slide on each other, thereby expanding the diameter of the lining material, to bring the lining material into close contact with the inner surface of the conduit.

Furthermore, when a conduit having a bending portion is lined with the lining material of this aspect, a gap possibly created between the lining material and the inner surface of the conduit in the bending portion is reduced by installing the lining material so that an overlapping portion of the both ends of the lining material sheet faces toward the outer curvature side of the bending portion.

DESCRIPTION OF EMBODIMENTS

Figure 1:
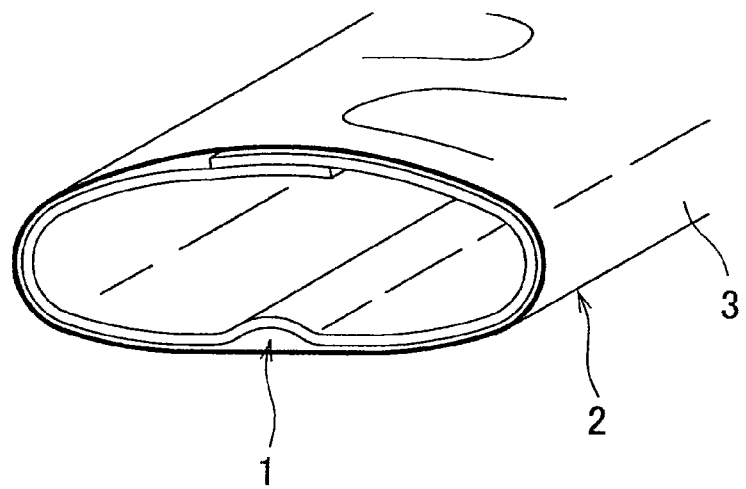
FIG. 1 is a perspective view of a lining material of an embodiment.

The following describes an embodiment of the present invention. FIG. 1 is a perspective view of a lining material of this embodiment. The lining material 1 of this embodiment is used to repair of an existing conduit for agricultural water, for example. The lining material 1 is inserted into the existing conduit and then inflated, so that the lining material 1 is installed in close contact with an inner surface of the conduit.

Figure 2:
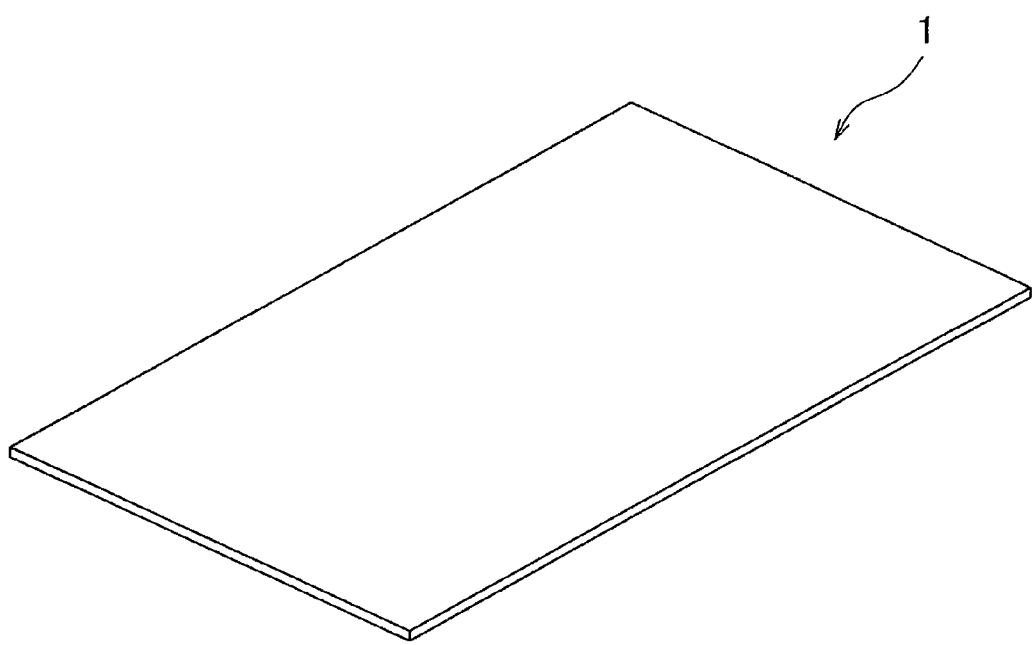
FIG. 2 is a perspective view of a lining material sheet before rolled into a tubular form.
Figure 3:
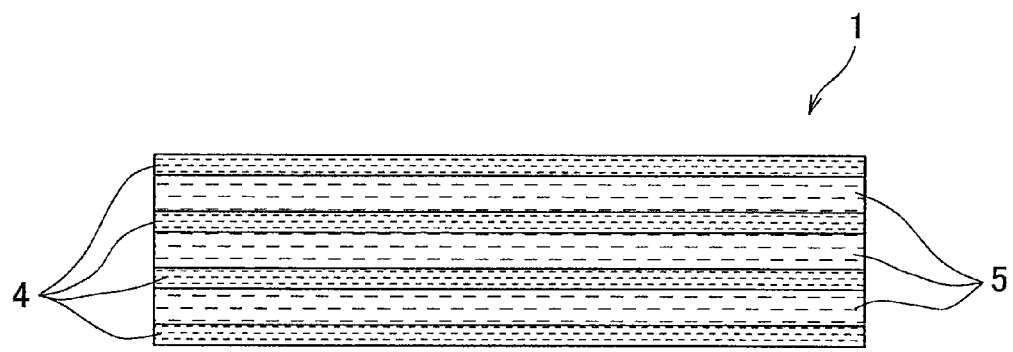
FIG. 3 is a sectional view of the lining material sheet.

First, the structure of the lining material 1 will be described. FIG. 2 is a perspective view of a lining material sheet before rolled into a tubular form, and FIG. 3 is a sectional view of the lining material sheet. As shown in FIG. 2, the lining material sheet 1 is a sheet-like member, and is rolled into a tubular form, to be used as the lining material 1. Further, as shown in FIG. 1, the lining material 1 obtained by rolling the lining material sheet 1 into the tubular form is inserted into a tubular woven fabric 2.

As shown in FIG. 3, the lining material sheet 1 is formed of a plurality of layers which are: non-woven fabrics 4 of organic fibers such as polyester (e.g., spunbond non-woven fabrics); and woven glass roving fabrics 5 each made by weaving high-strength glass roving. The non-woven fabrics 4 and woven glass roving fabrics 5 are alternately laid on one another, and the layers are joined together by needle punching. Specifically, the non-woven fabrics 4 are respectively laid on both sides of each woven glass roving fabric 5, and thus each woven glass roving fabric 5 is sandwiched by the non-woven fabrics 4. As described above, the lining material sheet 1 of this embodiment includes woven fabric made of glass yarns. This enhances its strength, and hence it is possible to decrease the overall thickness of the lining material 1. In addition, the woven fabric made of the glass yarns is particularly the woven glass roving fabric, and this further enhances the strength of the lining material 1.

Figure 4:
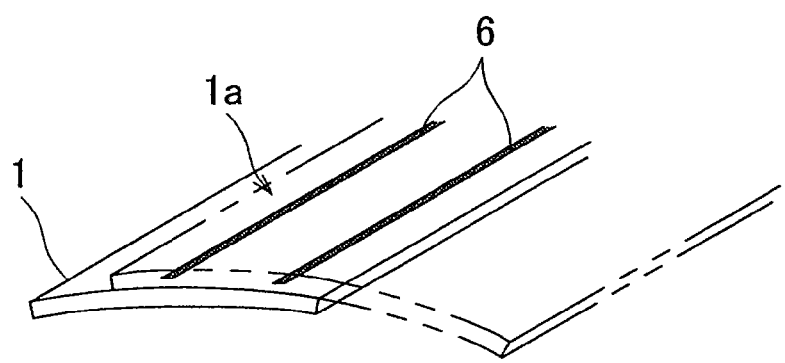
FIG. 4 is an enlarged view of an overlapping portion of the lining material of FIG. 1, where both ends of the lining material sheet in a circumferential direction overlap each other.

Further, both ends of the lining material sheet 1 rolled into the tubular form, i.e., the both ends in its circumferential direction are joined to each other by a hot melt adhesive 6 with the both ends overlapping each other. FIG. 4 is an enlarged view of an overlapping portion of FIG. 1 where the both ends of the lining material sheet overlap each other. As shown in FIG. 4, the hot melt adhesive 6 is not applied to all over the surface of one of the ends of the lining material sheet 1, but is partially applied thereto, specifically to a plurality of (two in FIG. 4) elongate regions on the surface which regions are parallel to a longitudinal direction of the tubular form. Then, the other end of the lining material sheet 1 is laid on the surface of the one end of the lining material sheet 1 on which surface the adhesive 6 has been applied, to join the both ends of the lining material sheet 1 to each other. Note that, hereinafter, the portion where both ends of the lining material sheet 1 overlap each other will be referred to as an "overlapping portion 1*a*".

Note that, the both ends of the lining material sheet 1 are temporarily joined merely to prevent the both ends from shifting relative to each other when the lining material 1 is inverted and inserted into the conduit P. As will be described later, when the lining material 1 heated in a diameter expansion step which is conducted after the lining material 1 is installed in the conduit P, the hot melt adhesive 6 is softened and thereby the joined both ends are released.

The tubular woven fabric 2 shown in FIG. 1 is made by weaving polyester fibers, for example. An outer surface of the tubular woven fabric 2 is coated with a coating 3 of a thermoplastic resin such as polyethylene, polypropylene, nylon, or polyester, to impart air tightness to the tubular woven fabric 2. Into the tubular woven fabric 2, the lining material 1 obtained by rolling the lining material sheet 1 into the tubular form is inserted, and thereby an outer surface of the lining material 1 is covered with the tubular woven fabric 2.

The above-described lining material 1 is produced through the following processes, for example. First, the glass roving is woven using a plain weaving machine, to make the woven glass roving fabrics 5. Then, the woven glass roving fabrics 5 and the non-woven fabrics 4 are alternately laid on one another and joined together by needle punching, and this lamination is cut to form the lining material sheet 1 having a predetermined width. Thereafter, the lining material sheet 1 is rolled into the tubular form. After the hot melt adhesive 6 is applied to the surface of one of the both ends of the lining material sheet 1, the other end of the sheet is laid on the one end, to join the both ends. The thus produced tubular lining material 1 is inserted into the tubular woven fabric 2, and then the lining material 1 and the tubular woven fabric 2 are wholly impregnated with the liquid thermosetting resin.

Note that, for impregnation with the liquid resin, there may be adopted a general way in which the lining material 1 into which the liquid thermosetting resin has been injected is squeezed using a nip roller. However, to more uniformly impregnate the lining material 1 with the resin, it is preferable to adopt the following way: a liquid resin having a lower viscosity than that of generally used resins (i.e., a liquid resin dripping at normal temperature) is injected into the lining material 1; and then the lining material 1 is conveyed to a higher position. With this, the lining material 1 is uniformly impregnated with the liquid resin while gravitationally removing extra liquid resin attached to the lining material 1. Further, compared with the way in which the lining material 1 is squeezed using the nip roller, the resin impregnation process is simplified. Note that, if the lining material 1 is conveyed after impregnated with the resin, the low-viscous liquid resin may drip. Therefore, it is preferable to conduct a viscosity increasing process (e.g., heating, cooling, or the like) depending on the type of the liquid resin to increase the viscosity, before the lining material 1 is conveyed.

Figure 5:
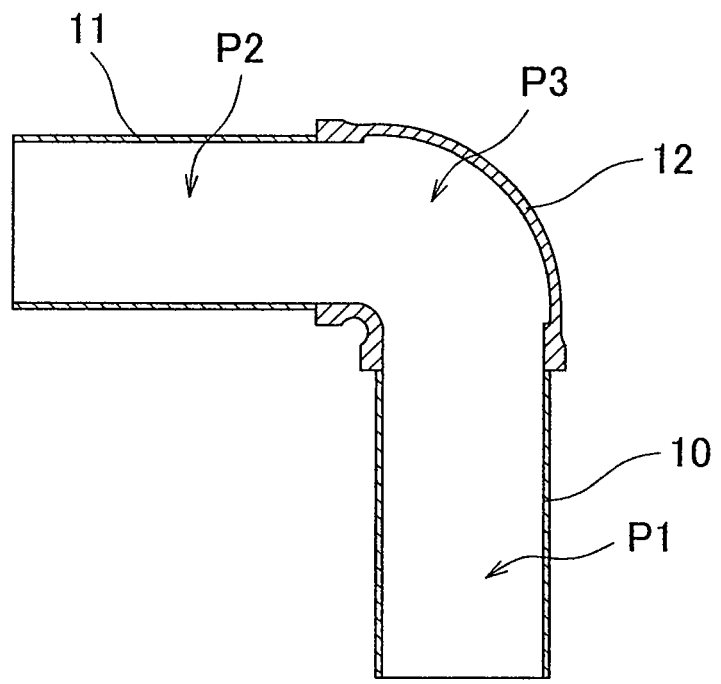
FIG. 5 is a sectional view of a bending portion of a conduit to be repaired.

The following describes a process of repairing the existing conduit P using the above-described lining material 1. FIG. 5 is a sectional view of a bending portion of the conduit to be repaired. As shown in FIG. 5, the conduit P to be repaired in this embodiment is structured by coupling two straight pipes 10 and 11 using a bend pipe 12 (a 90 degree elbow in FIG. 5). That is, the conduit P includes a bending portion P3 between two straight pipe portions P1 and P2.

To repair the conduit P using the lining material 1, first, the lining material 1 obtained by rolling the lining material sheet 1 into the tubular form is installed in the conduit P to be repaired (installation step). Then, the diameter of the lining material 1 installed in the conduit P is expanded with the both ends of the lining material sheet 1 circumferentially slid on each other (diameter expansion step). Further, in the above diameter expansion step, the lining material 1 is heated and pressurized from the inside thereof, to set the liquid thermosetting resin with which the lining material 1 has been impregnated while expanding the diameter of the lining material 1.

(Installation Step)

Figure 6:
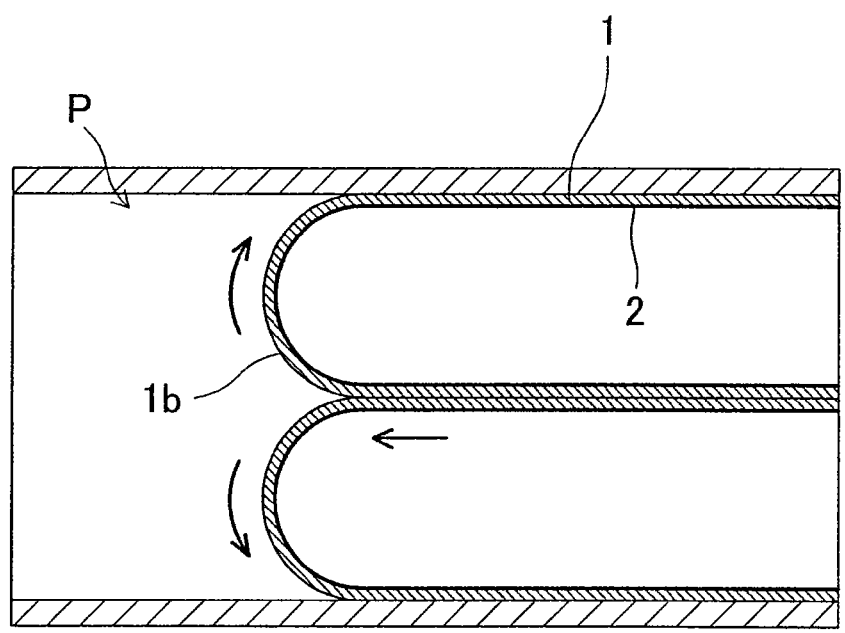
FIG. 6 is a longitudinal sectional view of the conduit at the time of installing the lining material.
Figure 7:
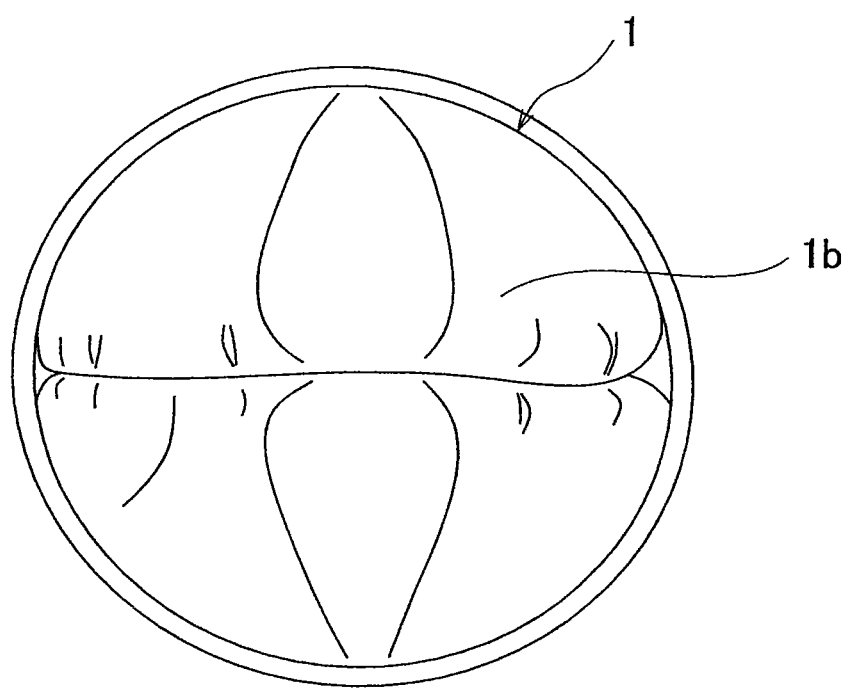
FIG. 7 is a view of a leading end portion of an inverted portion of the lining material which is being installed, viewed from a front with respect to a direction in which the lining material proceeds.

First, the installation step is described. FIG. 6 is a longitudinal sectional view of the conduit at the time of installing the lining material. FIG. 7 is a view of a leading end portion of an inverted portion of the lining material which is being installed, viewed from a front with respect to a direction in which the lining material proceeds. As shown in FIGS. 6 and 7, in this embodiment, the tubular lining material 1 impregnated with the liquid thermosetting resin is installed in the conduit P while inverting the lining material 1 so as to be inside out by applying fluid pressure thereto (inversion method). To be more specific, one end portion of the long lining material 1 wound on a reel (not shown) is turned inside out and then the entire circumference of the inside-out one end portion is secured to an end of the conduit P. An inner surface of the inside-out portion is coated with the airtight coating 3. Then, fluid pressure such as pressurized air is applied to the surface, which is coated with the coating 3, of the inside-out portion. As indicated with bold arrows in FIG. 6, the fluid pressure advances a leading end portion 1b of the inverted portion of the lining material 1 forward along the conduit P, and with this, the lining material 1 is unwound from the reel. This way, the inversion of the lining material 1 proceeds continuously, and the lining material 1 is inverted to be inside out over its whole length. In this inversion method, the fluid pressure advances the leading end portion 1b of the inverted portion of the lining material 1 along the conduit P, and therefore it is relatively easy to install the lining material 1 even though the conduit P has the bending portion P3. Further, as described above, the both ends of the lining material sheet 1 are joined (temporarily joined) to each other by the hot melt adhesive 6, and this prevents the both ends from shifting relative to each other and thereby expanding the lining material 1 during the inside-out inversion of the lining material 1.

Figure 8:
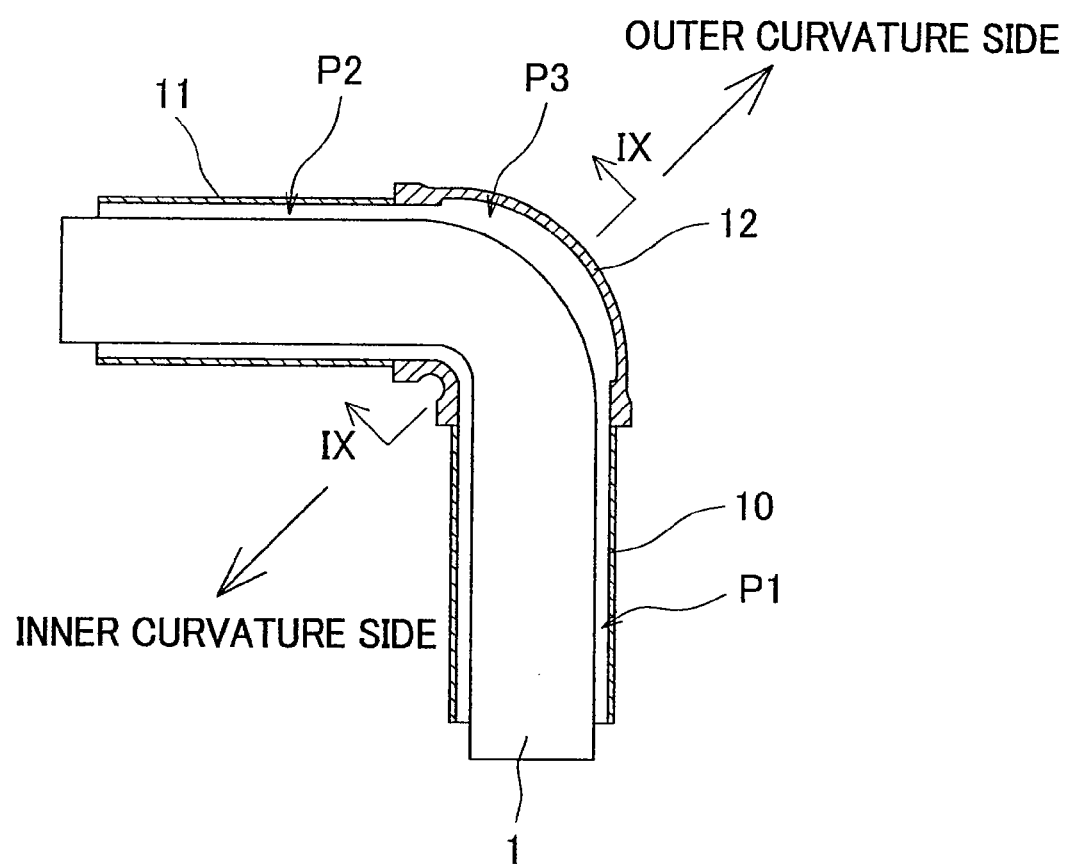
FIG. 8 is a sectional view of the bending portion of the conduit after an installation step.
Figure 9:
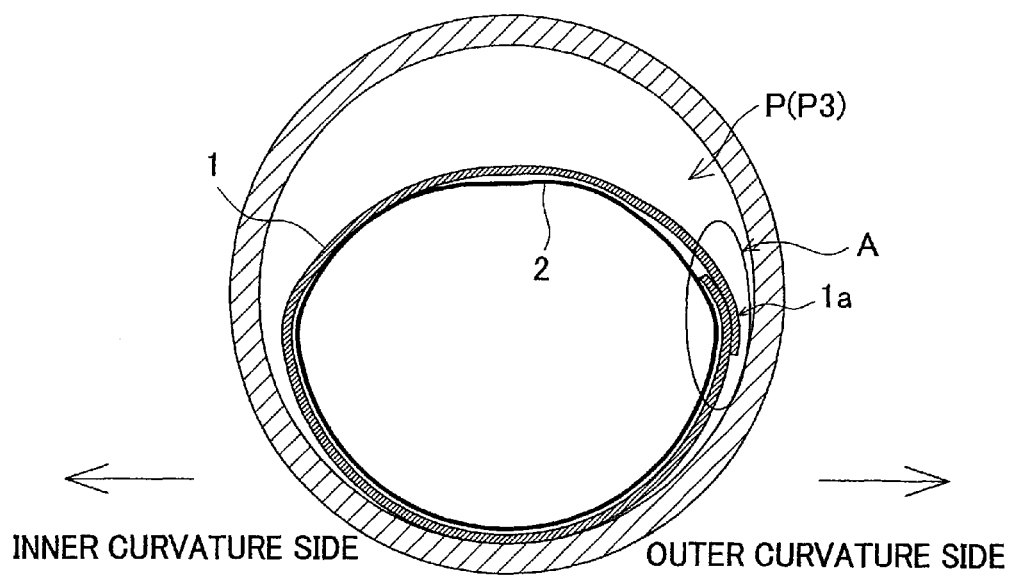
FIG. 9 is a sectional view taken along a line IX-IX in FIG. 8.
Figure 10:
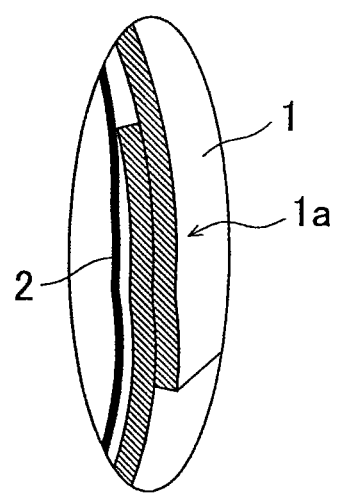
FIG. 10 is an enlarged view of the overlapping portion of the lining material, encircled with an ellipse A in FIG. 9.

FIG. 8 is a sectional view of the bending portion of the conduit after the installation step. FIG. 9 is a sectional view taken along a line IX-IX in FIG. 8. FIG. 10 is an enlarged view of the overlapping portion of the lining material, encircled with an ellipse A in FIG. 9. When the installation of the lining material 1 using the above inversion method is completed, the position (inside or outside) of the lining material 1 and the tubular woven fabric 2 is inverted, and therefore the inner surface of the lining material 1 is covered with the tubular woven fabric 2, as shown in FIG. 9.

Now, in this installation step, the lining material 1 is installed so that, in the bending portion P3, the overlapping portion 1a of the both ends of the lining material sheet 1 faces toward the outer curvature side of the bending portion P3, as shown in FIG. 9. Specifically, before the lining material 1 is installed in the conduit P using the inversion method, the lining material 1 is placed so that the overlapping portion 1a faces toward one of lateral sides of the conduit P (i.e., the side corresponding to the outer curvature side of the bending portion P3). The inversion of the lining material 1 is started after the above placement. Then, as shown in FIG. 9, the overlapping portion 1a of the lining material 1 faces a portion of the inner surface of the bending portion P3 which portion is on the outer curvature side. Note that, before repairing the conduit P, the condition of the inner surface of the conduit P is checked using a television camera inserted into the conduit P. On this occasion, the direction of the outer curvature side of the bending portion P3 of the conduit P is also checked using the television camera.

(Diameter Expansion Step)

Figure 11:
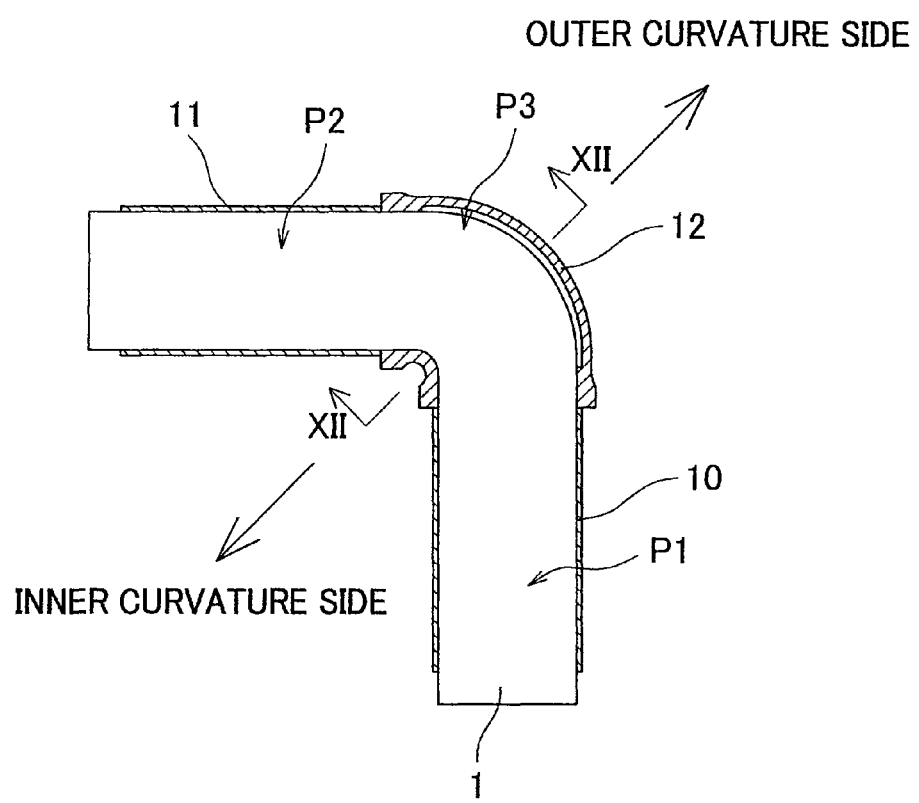
FIG. 11 is a sectional view of the bending portion of the conduit after a diameter expansion step.
Figure 12:
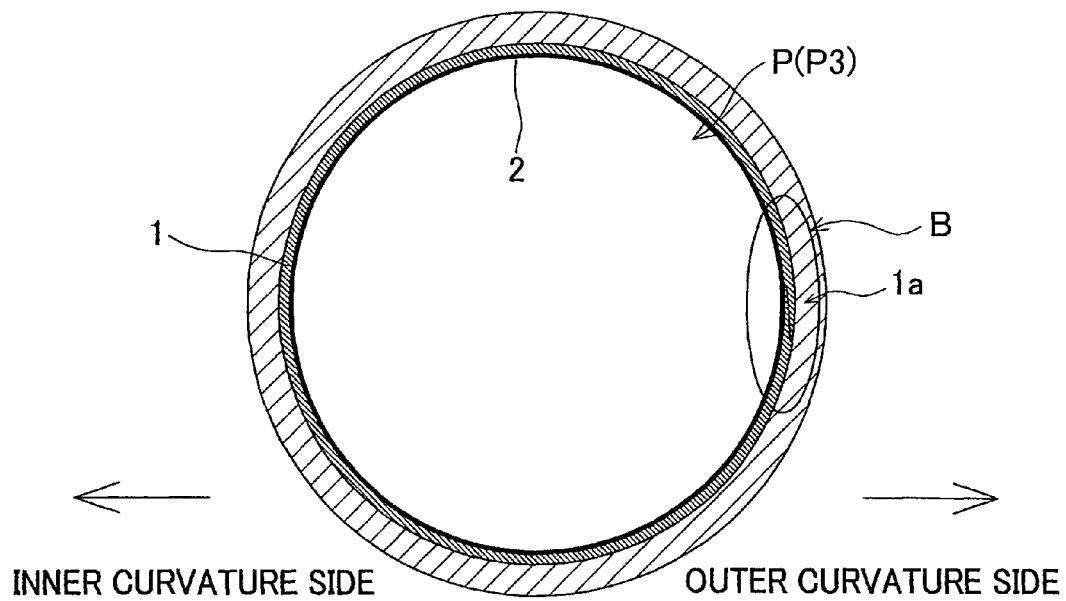
FIG. 12 is a sectional view of a line XII-XII in FIG. 11.
Figure 13:
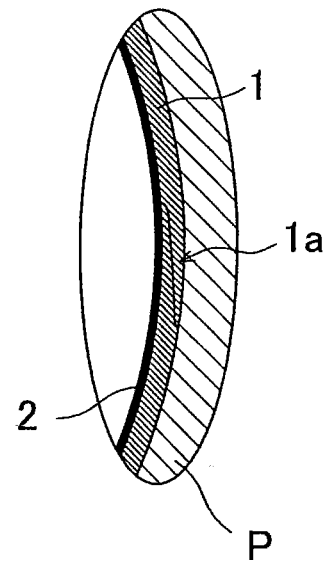
FIG. 13 is an enlarged view of the overlapping portion of the lining material, encircled by an ellipse B in FIG. 12.

Now, description will be given for the diameter expansion step. FIG. 11 is a sectional view of the bending portion of the conduit after the diameter expansion step. FIG. 12 is a sectional view taken along a line XII-XII in FIG. 11. FIG. 13 is an enlarged view of the overlapping portion of the lining material, encircled with an ellipse B in FIG. 12.

In the diameter expansion step, the lining material 1 installed in the conduit P is pressurized from the inside while heated to the setting temperature of the liquid thermosetting resin (for example, 80 to 100 degrees Celsius) or higher. Thereby, the diameter of the lining material 1 is expanded, and the liquid thermosetting resin is set. The way to heat the lining material 1 and pressurize to the lining material 1 from the inside thereof is not particularly limited. However, for example, it is convenient to use a heating medium, to simultaneously conduct the diameter expansion of the lining material 1 and the setting of the liquid thermosetting resin, as described below.

After the installation step (after inverted), the tubular woven fabric 2 is located inside the lining material 1, and the inner surface of the tubular woven fabric 2 is coated with the airtight coating 3. Therefore, by supplying a heating medium such as heated air or steam into the tubular woven fabric 2, the lining material 1 is pressurized from the inside thereof to expand its diameter, while heating the lining material 1.

In this diameter expansion step, the lining material 1 is heated to the setting temperature of the thermosetting resin (for example, 80 to 100 degrees Celsius). In this process, the hot melt adhesive 6 temporarily joining the both ends of the lining material sheet 1 is softened, and thereby its adhesion is decreased, which allows the both ends of the lining material sheet 1 to circumferentially slide on each other. Note that the type of the hot melt adhesive 6 may be determined appropriately based on the setting temperature of the liquid thermosetting resin. Simultaneously with this heating process, the lining material 1 is pressurized from the inside thereof, and this causes the both ends of the lining material sheet 1 to circumferentially slide on each other, to increase the diameter of the lining material 1. As a result, the lining material 1 is pressed onto the inner surface of the conduit P to be brought into close contact with the inner surface, and in this state, the thermosetting resin is thermally set. Thus, on the inner surface of the conduit P, there is formed a robust lining structure in which the thermosetting resin is reinforced by the high-strength woven glass roving fabrics 5.

By the way, in the above-described installation step, the lining material 1 is installed so that, in the bending portion P3 of the conduit P, the overlapping portion 1a of the both ends of the lining material sheet 1 faces toward the outer curvature side of the bending portion P3, as shown in FIG. 9. Therefore, when the diameter of the lining material 1 is expanded in the diameter expansion step, the both ends of the lining material sheet 1 circumferentially slide on each other, while the overlapping portion 1a faces toward the outer curvature side of the bending portion P3. This facilitates outward inflation of a portion of the lining material 1 which portion faces toward the outer curvature side. Consequently, as shown in FIGS. 11 and 12, a gap between the lining material 1 and the inner surface of the conduit P is decreased in the bending portion P3, and it is more likely that the lining material 1 fits the inner surface of the conduit P over its entire circumference, also in the bending portion P3. Note that, in the bending portion P3 of the conduit P, the lining material 1 is inflated outward since the both ends of the lining material sheet 1 slide on each other widely. Therefore, the distance which the both ends slide in the bending portion P3 is larger than that in each of the straight pipe portions P1 and P2 of the conduit P. In other words, the size of the overlapping portion 1a of the lining material 1 in the bending portion P3 is smaller than that in each of the straight pipe portions P1 and P2.

The larger the amount of curvature of the bending portion P3 is (the smaller the radius of curvature is), the larger the difference between the inside arc length and the outside arc length of the curvature of the bending portion P3 is, and therefore, the more likely it is that a gap is created between the lining material 1 and the inner surface of the bending portion P3 on the outer curvature side. Therefore, the present invention, which enables the lining material 1 to be greatly inflated toward the outer curvature side of the bending portion P3, is effective particularly in such a case where the amount of curvature of the bending portion P3 is large.

Further, the inversion method is used in the above-described installation step in this embodiment, and therefore it is more likely that large tension is applied to the lining material 1 when the lining material 1 is inverted to be inside out. Furthermore, when the both ends of the lining material sheet 1 slide on each other to expand the diameter of the lining material 1 in the diameter expansion step, it is more likely that large friction is produced between the both ends. Such a large external force applied to a part of the lining material 1 is more likely to cause yarn slippage in the woven glass roving fabrics 5. However, in the lining material 1 of this embodiment, the non-woven fabrics 4 are laid on the woven glass roving fabrics 5 and they are joined together by needle punching. Further, each non-woven fabric 4 has a structure in which long fibers are entangled. Therefore, when an external force is applied to the woven glass roving fabrics 5, the non-woven fabrics 4 joined to the woven glass roving fabrics 5 apply resistance to the glass yarns forming each woven glass roving fabric 5, to suppress shifting of the glass yarns, i.e., the yarn slippage in the woven glass roving fabrics 5.

Further, when the plurality of woven glass roving fabrics 5 are cut out from a large woven glass roving fabric in the process of producing the lining material sheet 1, a cut edge of each woven glass roving fabric 5 is liable to ravel out. However, in this embodiment, the non-woven fabrics 4 are laid on the woven glass roving fabrics 5, and this also prevents raveling out of the woven glass roving fabrics 5 at an edge. Moreover, in this embodiment, the non-woven fabrics 4 are respectively laid on the both sides of each woven glass roving fabric 5, and the non-woven fabrics 4 and the woven glass roving fabrics 5 are joined together by needle punching with each woven glass roving fabric 5 sandwiched by the two non-woven fabrics 4. This further suppresses the yarn slippage in the woven glass roving fabrics 5 and the raveling out at an edge.

Now, description will be given for modifications in which various changes have been made to the above-described embodiment. It should be noted that the components similar to those in the above-described embodiment will be given the same reference numerals, and the description thereof will be omitted.

1] The structure of the lining material sheet is not limited to that in the above-described embodiment. For example, a lining material sheet having the following structure may be used.

(1) In the above-described embodiment, the non-woven fabrics 4 are respectively laid on the both sides of each woven glass roving fabric 5, and each woven glass roving fabric 5 is sandwiched by two non-woven fabrics 4. However, the non-woven fabric 4 may be laid on only one of the both sides of each woven glass roving fabric 5. This structure also provides the effect of preventing yarn slippage in the woven glass roving fabric 5, or preventing raveling out at an edge.

(2) The woven fabric made of the glass yarns is not limited to the woven glass roving fabric formed of the glass roving made of paralleled glass yarns. A glass cloth may be used, which is made by weaving twisted glass yarns.

Figure 14:
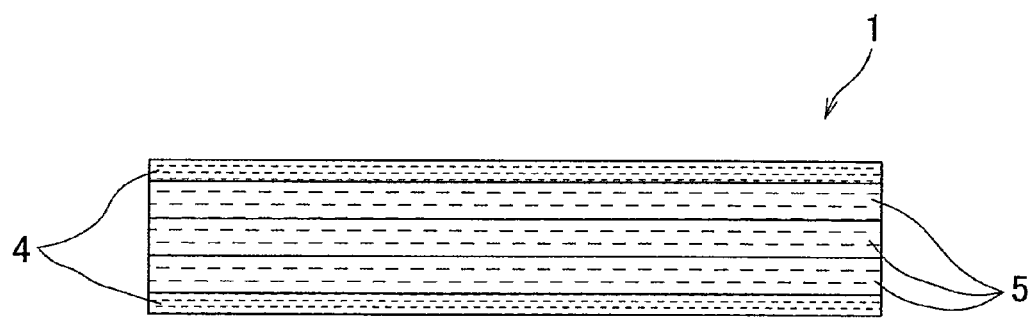
FIG. 14 is a sectional view of a lining material sheet of a modification.
Figure 15:
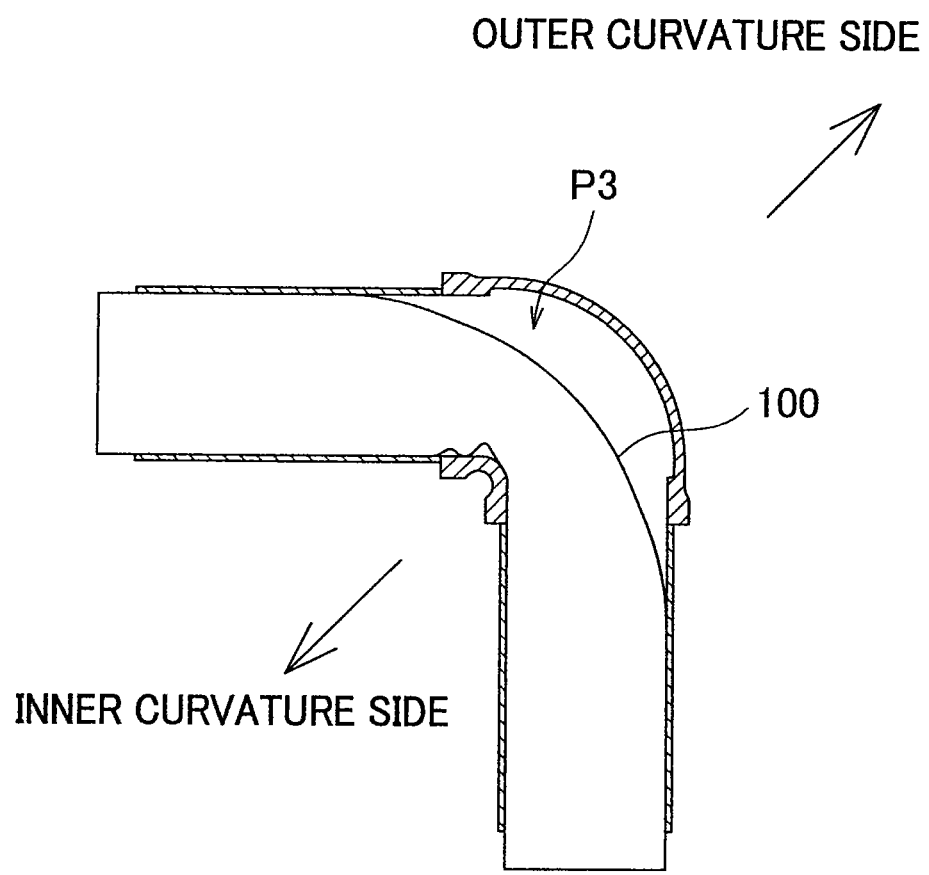
FIG. 15 is a sectional view of a bending portion of a conduit repaired according to a conventional method.

(3) The lining material sheet does not have to have the structure in which the woven fabric(s) made of the glass yarns and the non-woven fabric(s) laid on one another. For example, one or more of the non-woven fabrics 4 may be omitted. For instance, the non-woven fabrics 4 and the woven glass roving fabrics 5 do not have to be alternately laid on one another. As shown in FIG. 14, the non-woven fabrics 4 are respectively laid only on upper and lower sides of a stack of the woven glass roving fabrics 5. Alternatively, no non-woven fabric 4 may be provided. Further, the layer of the reinforced fiber in the lining material does not have to be the woven fabric of the glass yarns. For example, as same as in Patent Literature 1 mentioned above, the lining material sheet may be sheet molding compound (SMC) in which high-strength short fibers are dispersed on a liquid thermosetting resin.

2] The above-described embodiment deals with a case where the lining material of the present invention is applied to the so-called inversion method, where the tubular lining material 1 is installed in the conduit P while inverting the lining material 1 so as to be inside out. However, the lining material of the present invention may be applied to a method in which the lining material is installed in the conduit P by drawing the lining material into the conduit P without inverting the lining material. Also in the above case, a large external force (tension) is applied to the lining material for example when the lining material is drawn into the conduit P and/or when the diameter of the lining material is expanded; however, yarn slippage in the woven glass roving fabrics 5 is prevented when the non-woven fabrics 4 are laid on the woven glass roving fabrics 5 as is in the above-described embodiment.

3]The liquid setting resin with which the lining material 1 is impregnated is not limited to a thermosetting resin. A photosetting resin or a cold setting resin may be used. However, in the case where the both ends of the lining material sheet 1 is temporarily joined by the hot melt adhesive 6 as is in the above-described embodiment, it is preferable to use a liquid thermosetting resin so that setting of the liquid resin and softening of the hot melt adhesive 6 (release of the joint) can be conducted at the same time.

4] In the above-described embodiment, the both ends of the lining material sheet 1 rolled into the tubular form are joined to each other by the hot melt adhesive 6. However, the both ends may be joined in another way, for example, by sewing. It should be noted that, if the both ends are joined by sewing, the both ends have to be joined relatively loosely so that a sewed portion can be torn when the pressure is applied to the lining material 1 from inside in the diameter expansion step.

Further, it is not particularly necessary to join the both ends of the lining material sheet to each other in the case where there is no possibility that the tubular lining material significantly expands at the time of installing the lining material in the conduit, due to high friction between the overlapping both ends, for example.

5] The above-described embodiment deals with a case where the present invention is applied to repair an existing conduit. However, the lining material may be installed to reinforce a conduit, irrespective of whether the conduit is existing or new.

REFERENCE SIGNS LIST

1 lining material (lining material sheet)
1a overlapping portion
4 non-woven fabric 5 woven glass roving fabric
6 hot melt adhesive
P conduit
P3 bending portion

The invention claimed is:

1. A method for lining a conduit having a bending portion, the method comprising:
   installing in the conduit a lining material obtained by rolling a lining material sheet into a tubular form, with both ends of the lining material sheet in its circumferential direction circumferentially overlapping each other; and
   expanding a diameter of the lining material installed in the conduit while circumferentially sliding the both ends of the lining material sheet on each other, wherein
   in the installing, the lining material is installed so that an overlapping portion where the both ends of the lining material sheet overlap each other faces toward an outer curvature side of the bending portion, in the bending portion of the conduit.

2. The method according to claim 1, wherein the lining material sheet includes a woven fabric made of glass yarns.

3. The method according to claim 2, wherein the woven fabric made of the glass yarns is a woven glass roving fabric of which glass roving is made of paralleled glass yarns.

4. The method according to claim 2, wherein the lining material sheet has a structure in which a non-woven fabric of organic fibers is laid on the woven fabric made of the glass yarns, and the non-woven fabric and the woven fabric are joined to each other by needle punching.

5. The method according to claim 4, wherein the non-woven fabric includes a plurality of non-woven fabrics, and the non-woven fabrics are respectively laid on both sides of the woven fabric made of the glass yarns.

6. The method according to claim 1, wherein:
   the lining material is impregnated with a liquid thermosetting resin; and
   in the expanding, the lining material is heated and pressurized from an inside thereof, to set the liquid thermosetting resin while expanding the diameter of the lining material with the both ends of the lining material sheet slid on each other.

7. The method according to claim 6, wherein:
   the both ends of the lining material sheet rolled into the tubular form are joined to each other by a hot melt adhesive with the both ends overlapping each other; and
   in the expanding, the lining material is heated and pressurized from the inside thereof, to release the both ends joined by the hot melt adhesive.

8. A lining material composite for a conduit, comprising:
   a lining material obtained by rolling a lining material sheet into a tubular form and placed on an inner surface of the conduit; and
   a tubular woven fabric placed on an inner surface of the lining material into the tubular form, an inner surface of the tubular woven fabric being coated with a coating of a thermoplastic resin, wherein
   the lining material sheet includes a non-woven fabric of organic fibers and a woven fabric made of glass yarns which are laid on each other and joined to each other by needle punching,
   both ends of the lining material sheet in its circumferential direction are joined to each other by a hot melt adhesive with the both ends overlapping each other, and
   the hot melt adhesive joining the both ends is applied to a plurality of elongate regions parallel to a longitudinal direction of the lining material into the tubular form.

* * * * *